Sept. 16, 1924.  
C. R. BRYAN  
1,508,955  
DIRECTION SIGNAL FOR MOTOR VEHICLES  
Filed Sept. 23, 1921  2 Sheets-Sheet 1
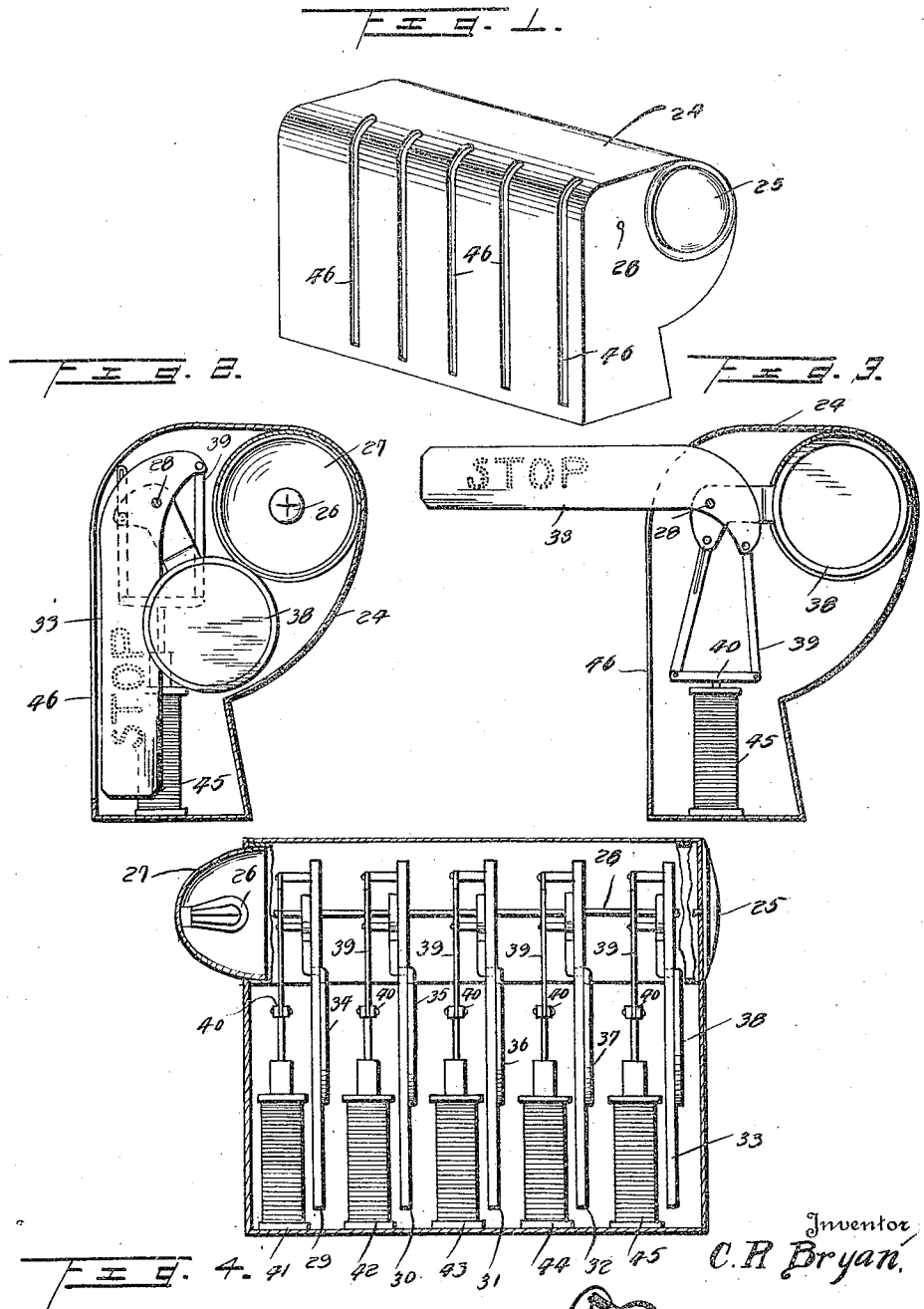

Sept. 16, 1924.
C. R. BRYAN
1,508,955
DIRECTION SIGNAL FOR MOTOR VEHICLES
Filed Sept. 23, 1921  2 Sheets-Sheet 2
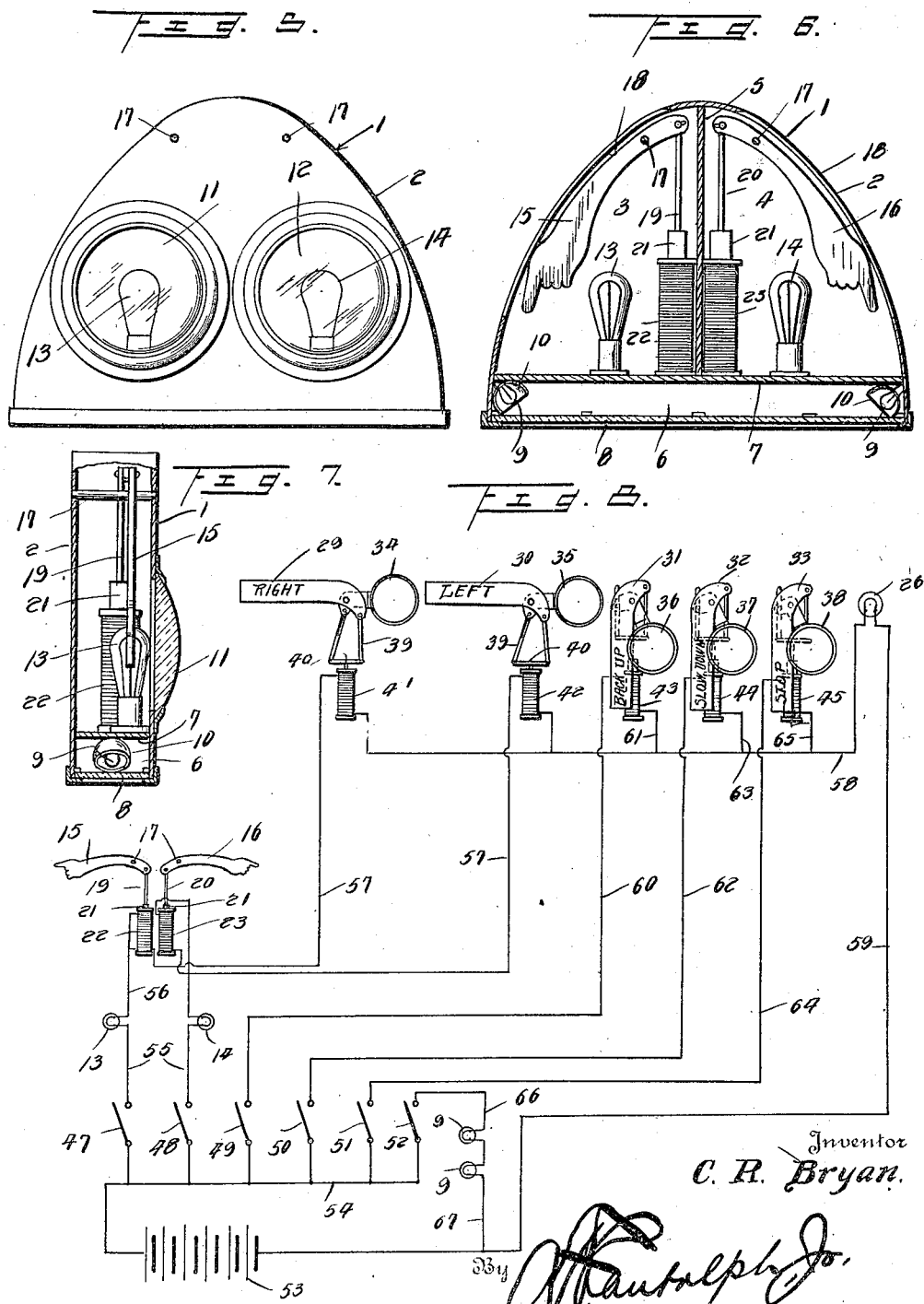

Patented Sept. 16, 1924.

1,508,955

UNITED STATES PATENT OFFICE.

CHARLES R. BRYAN, OF NEW YORK, N. Y.

DIRECTION SIGNAL FOR MOTOR VEHICLES.

Application filed September 23, 1921. Serial No. 502,730.

*To all whom it may concern:*

Be it known that I, CHARLES R. BRYAN, a subject of the King of Denmark, residing at New York, in the county of New York and State of New York, have invented certain new and useful Improvements in Direction Signals for Motor Vehicles; and I do hereby declare the following to be a full, clear, and exact description of the invention, such as will enable others skilled in the art to which it appertains to make and use the same.

This invention relates to a direction signal for motor vehicles and the object is to provide means whereby the driver of a car may indicate to the individual operating a car immediately following that first named, the direction in which he intends to proceed.

A further object of this invention is to provide means whereby the operator of a car may display a signal at the front and at the rear indicating the direction in which he intends to travel, or whether he will slow down or stop, the signals including indicating semaphore arms and electrically energized and illuminated devices.

A still further object of this invention is the provision of a direction signal of the above stated character which will be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description, and accompanying drawings, in which:—

Figure 1 is a perspective view illustrating a direction signal constructed in accordance with my invention and adapted for use upon the rear end of a vehicle, Figure 2 is a transverse sectional view illustrating the same with the semaphore arms and lens arms in non-signaling position, Figure 3 is a similar view illustrating the semaphore arm and lens arm in signaling position, Figure 4 is a vertical longitudinal sectional view illustrating the device, Figure 5 is a front elevation illustrating a direction signal designed for use upon the front end of the vehicle, Figure 6 is a transverse sectional view illustrating the same, Figure 7 is a vertical longitudinal sectional view illustrating the same, Figure 8 is a diagrammatical view illustrating the wiring diagram.

Referring in detail to the drawings, the numeral 1 indicates as an entirety a direction signal designed for use on the front end of a vehicle and consists of a substantially dome-shaped casing 2 divided into compartments 3 and 4 by a partition 5 and also divided to provide a chamber 6 by a partition 7. The chamber 6 is closed by a transparent panel 8 for the purpose of permitting light rays to shine on a license tag supported by the casing 2 and the chamber 6 has located therein electric lamps 9 equipped with reflectors 10. The front wall of the casing 2 is provided with openings closed by yellow and purple lenses 11 and 12 arranged in front of the compartments 3 and 4 respectively, and said compartments have located therein electric lamps 13 and 14 which when illuminated are adapted to cast different color lights by means of the lenses 11 and 12. Signal arms 15 and 16 are pivotally mounted upon shafts 17 within the compartments 3 and 4 and when in non-signaling position lie wholly within the casing and when in signaling position they move outwardly of the casing by way of slots 18 formed in the side walls of the casing. The signaling arms 15 and 16 may be of any desired shape preferably in the form of a hand with the index finger extended and the signaling arm 15 is preferably yellow to agree with the lens 11, while the signaling arm 16 is preferably purple to agree with the lens 12. The signaling arms 15 and 16 have pivoted to their pivoted ends rods 19 and 20 which are in turn connected to cores 21 operable within solenoids 22 and 23. The solenoids 22 and 23 are connected electrically to the electric lamps 13 and 14 respectively so that on the energization of either of the electric lamps the corresponding solenoid will be energized to move the proper signaling arm into signaling position. On the deenergization of the solenoids, the signaling arms return to nonsignaling position within the casing by gravity.

The rear direction signal includes a casing 24 which is substantially P-shape in end elevation and is provided in its end or front wall with an opening closed by a magnifying lens 25. An electric lamp 26 is carried by the rear or other end wall of the casing and located within the casing and in direct alinement with the lens 25 and is surrounded by a deflector 27 for the purpose of normally displaying a clear light from the front of the casing. A shaft 28 is located within the casing between the front and rear walls and has pivotally mounted thereon signaling arms 29, 30, 31, 32 and 33. The signaling arms described have associated therewith lens supporting arms 34, 35, 36, 37 and 38. The lens supporting arms and the signaling arms are arranged in pairs and have connected thereto rods 39 which are in turn pivoted to heads 40 connected to the cores of solenoids 41, 42, 43, 44 and 45 and said solenoids are located within the casing. The lens supporting arm 34 carries a lens of yellow to correspond with the yellow lens 11 and the lens supporting arm 35 carries a purple lens to agree with the purple lens 12 of the front signal, thus it will be seen that corresponding signals may be given at the front and rear of the vehicle. The lens supporting frames 36, 37 and 38 carry lenses of blue, green and red color respectively. When the signaling arms are moved into signaling positions, the lenses are adapted to move in rear of the clear lens 25 so as to make or render a light of a color to agree with the color displayed by the signaling arm. The signaling arm 29 is adapted to indicate a right turn while the signaling arm 30 is adapted to indicate a left turn. The signaling arm 31 and the lens associated therewith is adapted to indicate a movement in a reverse direction or a back-up. The signaling arm 32 and the green lens carried by the lens arm 37 is adapted to indicate a reduction in speed or a slow-down while the signaling arm 33 and the red lens carried by the lens arm 38 is adapted to indicate a stop. The casing 24 is provided with a series of slots 46 for the purpose of permitting the signaling arms 29, 30, 31, 32 and 33 to move out of the casing when the respective solenoids of said arms are energized. The signal arms last referred to and their respective lens frames are adapted to return to non-signaling position by gravity when the respective solenoids are deenergized.

A series of switches 47, 48, 49, 50, 51 and 52 are located in a group and in close proximity to the operator of the respective vehicle and they have one of their poles connected to one of the poles of the battery or electrical source 53 by means of a conductor 54. The electric lamps 13 and 14 are connected to the other poles of the switches 47 and 48 by conductors 55 and said electric lamps are connected to the solenoids 22 and 23 by conductors 56. The solenoids 22 and 23 are connected to the solenoids 41 and 42 by conductors 57 and the last named solenoids are connected to a conductor 58 which is in turn connected to the electric lamp 26 of the rear signal and the latter is connected to the other pole of the battery or electrical source by a conductor 59. Therefore, it is apparent that on closing the switch 47 the yellow signals of the front and rear casings will be simultaneously operated and also the electric lamps 13, and 26. The closing of the switch 48 will operate the left hand or purple signal to the front and rear casing and also the electric lamps 14 and 26. The switch 49 is connected to the solenoid 43 by a conductor 60 and the latter is connected to the conductor 58 by a conductor 61. The switch 51 is connected to the solenoid 44 by a conductor 62 and the last named solenoid is connected to the condutor 58 by a conductor 63. The switch 51 is connected to the solenoid 45 by a conductor 64 and the solenoid 45 is connected to the conductor 58 by a conductor 65. The switch 52 is connected to the electric lamps 9 by a conductor 66 and said lamps 9 are connected to the conductor 59 by a conductor 67.

It is apparent that the closing of the switches 49, 50, and 51 will actuate the signaling arms 31, 32. and 33 and their respective lens supporting arms 36, 37, and 38 while the switch 52 controls the electric lamps 9 used for illuminating the license tag.

If desired the front wall of the casing 24 may be provided with an additional opening closed by a red lens and have positioned in the rear of the same an electric lamp that may be placed in circuit with the electric lamps 9 for the purpose of providing a tail light.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A signaling device including a casing provided with a source of light, a signal arm pivotally mounted and normally retracted within the casing, a lens in line with the source of light and to be viewed from the exterior thereof, a carrying frame for said lens pivotally mounted and normally retracted within the casing, a head, connections from said head to said arm and frame, said arm and frame being movable in opposite directions, and means to actuate said head whereby said arm will be projected from the casing and said lens will be disposed in the path of rays from said source of light.

2. A signaling device including a casing provided with a source of light, a normally retracted signal arm, a lens in line with the source of light and to be viewed from the exterior thereof, a normally retracted carrying frame for said lens, means to pivot said arm and frame in the casing on a common axis for movement in opposite directions, a head, rods connecting said head and said arm and frame, and means to actuate said head whereby said arm will be projected from the casing and said lens will be disposed in the path of rays from said source of light.

3. A signaling device including a casing provided with a source of light therein and a lens in line therewith and to be viewed from the exterior thereof, a shaft in said casing, signal arms pivoted on said shaft and normally disposed within the casing, said casing having slots through which said arms are adapted to be projected, lenses of different colors, carrying frames for said lenses pivoted on said shaft and movable in the opposite direction to the signal arms, heads within the casing, connecting means between said opposite ends of said heads and said arms and frame, and means to individually actuate said heads whereby said arms will be projected and said lenses will be disposed intermediate and in line with said source of light and the first mentioned lens.

In testimony whereof I affix my signature in presence of two witnesses.

CHARLES R. BRYAN.

Witnesses:
CLAUDIUS A. MEADE,
MARGARET HOWARD.